UNITED STATES PATENT OFFICE.

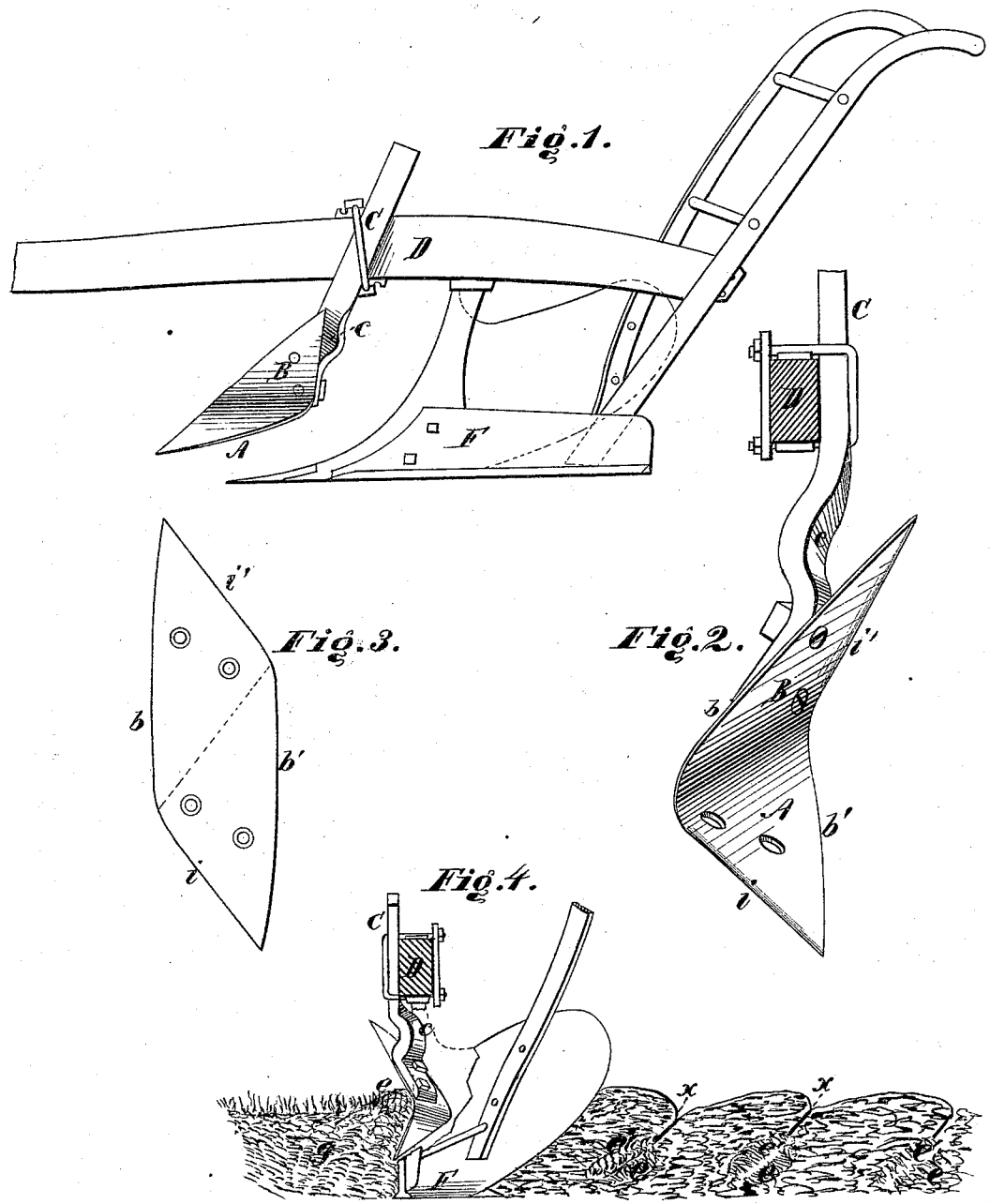

JOHN RUNYON, OF MARSHALL TOWNSHIP, MICHIGAN.

IMPROVEMENT IN PLOWS.

Specification forming part of Letters Patent No. 130,751, dated August 20, 1872.

Specification describing certain Improvements in Plow-Colters, invented by JOHN RUNYON, of the township of Marshall, in the county of Calhoun and State of Michigan.

My invention is designed as an improvement on the bent or angular cutting colter, patented by Runyon and Ingersoll August 10, 1869; and relates to the construction of the angular cutting point, separate and detachable or not from the colter-bar, and to the combination with such point of a clearing-wing forming a part thereof, and constituting two flat planes lying at such angle with each other and having their edges so shaped and their plane surfaces so set in relation with the draft-lines of the plow that when the plow is in motion and the angular-cutting colter-point is making a sloping cut in the sod to land, its side clearing-wing (which stands at an obtuse angle with the line of the plow's land-side) presses the angular strip of sod back to land, so that the land-side of the plow may slide past without breaking off the said strip, which, when the furrow is turned, will be left adhering to and projecting from the ground surface on the land-side of the furrow, to be turned down compactly to the very bottom on plowing the next furrow. The clearing-wing furnishes also a smooth ascending edge, along which all loose accumulations tending to choke up are conveyed to land past the colter-bar. The main object of my invention is not to separate a corner ribbon of the sod from the ground-slice to be turned over by the plow, for that has been done before, as stated, by the bent colter; but it is to compact said ribbon-strip in its adherence to the land, and save it unbroken for the next plowing, so that no frittered-away pieces may be left on top of the plowed ground to commence growing immediately, which is a frequent result of the use of what is known as the jointer-plow.

Figure 1 is a side elevation of a plow carrying a colter embodying my invention. Fig. 2 is a front elevation of said colter and bar attached to a section of the beam. Fig. 3 is a reversible colter-plate before being bent. Fig. 4 is a hind elevation of a plow in the furrow, and vertical cross-section of adjacent land, part of the plow being broken away to expose the colter and show its action.

The blade of my improved colter consists of two flat and somewhat triangular-shaped plate sections, marked respectively A and B, constructed in one piece, and bolted to the bar C, said bar being bolted at a suitable point to the side of the plow-beam D by a gripe or in any other ordinary and approved way. This colter-blade and bar may be formed in cast metal; but I usually form a thinnish plate of rolled steel to the proper shape and size, and bend it short in a diagonal line across, (as shown in the dotted line, Fig. 3,) so that the bent sections will form a right angle with each other or thereabout. The bar C is bent and twisted as shown at $c$, so that a free space will be left between it and the upper part of the clearing-wing B, and also that when the colter is attached to the plow-beam in working position the cutting section will lie at the proper slope for slicing the sod about as indicated by the short line $x$ in Fig. 4, where $g$ indicates the ground section, and so that the edges $i'$ and $b'$ of the two bent plates will lie in the same vertical plane with the land-side of the plow.

Should it be deemed advisable to fasten the colter-bar to the right side of the plow-beam the twist would still be the same, but the bend would require modifying to suit the changed position.

A reference to Fig. 4 will make clear the operation. The cutting section A of the colter makes a sloping slit in the sod in advance, and the flat angular face of the clearing-wing B forces the corner strip, so slit, back to land, as shown at $e$, without breaking or turning it, but so as to allow the plow land-side to slide past, leaving said strip still adhering to the standing sod and projecting from the land-side of the furrow made by the passage of the plow. The positions of the layers of sod and attached corner strips are shown respectively at $e'$ and $e$ in the plowed ground at the right of the figure. The plow's motion causes any tangled accumulations to slide obliquely up and along the smooth ascending edge $b$ of the wing B, and fall in a favorable position to be buried in mass along with the compressed sod strip at the next plowing.

The colter shown in Fig. 2 is designed to be reversible on the bar, being furnished with two sharpened edges, $i$ and $i'$, to be used in succession, and with two ranges of bolt-holes to match the holes in the bar. If this colter-blade is to be made out of rolled plate, the shape of such plate is indicated in Fig. 3, the diagonal dotted line showing the line of the bend. This reversibility, however useful in furnishing two cutting-edges, thereby saving time in resharpening, or the necessity for extra blades, is not necessarily an indispensable feature in my invention, for the colter will work equally well if the sections A and B do not correspond with each other in exact size and form, or be even bent to form a right angle, which they must be if designed for reversal. The clearing-wing B may stand vertical and so form an obtuse angle with the cutting section A, inasmuch as said wing has none of the lines of a mold-board and is not designed to turn a furrow in the manner of a "jointer," which is the name given in some places to the small plow which plows a furrow in advance of the large plow, as in the subsoil arrangement.

I disclaim, irrespectively and of itself, the angular cutting section A, as it is substantially the same as the bent colter point of Runyon and Ingersoll, aforesaid; but

I claim as my invention—

A colter-blade consisting of the plate A B, made substantially in the form shown, and comprising a cutting portion, A, and clearing-wing B, both of which are plane surfaces lying at an angle with each other, in combination with the curved and twisted shank C c, arranged as shown with relation to the plow, whereby the furrow-slice is not turned over, but compacted in its adherence to the "land," and remains unbroken, substantially as set forth.

JOHN RUNYON.

Witnesses:
P. S. BARRY,
OTTO LEE JOHNSON.